US008500541B2

(12) United States Patent
Veenker

(10) Patent No.: US 8,500,541 B2

(45) Date of Patent: Aug. 6, 2013

(54) WAGERING GAME WITH PREVIEW FEATURE FOR A WINNING PAYLINE

(75) Inventor: Brian Veenker, Woodburn, OR (US)

(73) Assignee: WMS Gaming Inc., Waukegan, IL (US)

( * ) Notice: Subject to any disclaimer, the term of this patent is extended or adjusted under 35 U.S.C. 154(b) by 2778 days.

(21) Appl. No.: 11/207,307

(22) Filed: Aug. 19, 2005

(65) Prior Publication Data

US 2007/0060245 A1 Mar. 15, 2007

(51) Int. Cl.
*G06F 17/00* (2006.01)

(52) U.S. Cl.
USPC .................. 463/20; 463/16; 463/17; 463/18; 463/19

(58) Field of Classification Search
USPC ................................................ 463/20, 31–32
See application file for complete search history.

(56) References Cited

U.S. PATENT DOCUMENTS

| | | | | |
|---|---|---|---|---|
| 5,971,855 | A | 10/1999 | Ng | |
| 5,980,384 | A | 11/1999 | Barrie | |
| 6,050,895 | A | 4/2000 | Luciano, Jr. et al. | |
| 6,089,976 | A | 7/2000 | Schneider et al. | |
| 6,089,977 | A | 7/2000 | Bennett | |
| 6,162,120 | A | 12/2000 | Takahashi et al. | |
| 6,162,123 | A | 12/2000 | Woolston | |
| 6,251,013 | B1 | 6/2001 | Bennett | |
| 6,261,178 | B1 | 7/2001 | Bennett | |
| 6,270,402 | B1 | 8/2001 | Fujioka et al. | |
| 6,309,299 | B1 | 10/2001 | Weiss | |
| 6,488,586 | B1 | 12/2002 | Kobayashi et al. | |
| 6,604,999 | B2 | 8/2003 | Ainsworth | |
| 6,644,664 | B2 | 11/2003 | Muir et al. | |
| 6,695,696 | B1 * | 2/2004 | Kaminkow | 463/16 |
| 6,805,632 | B2 | 10/2004 | Suda | |
| 6,896,615 | B2 | 5/2005 | Berman | |
| 2003/0045345 | A1 * | 3/2003 | Berman | 463/20 |
| 2003/0073491 | A1 * | 4/2003 | Hecht et al. | 463/35 |
| 2003/0092487 | A1 * | 5/2003 | Meyer | 463/30 |
| 2004/0048650 | A1 | 3/2004 | Mierau | |
| 2004/0077402 | A1 | 4/2004 | Schlottmann | |
| 2004/0162133 | A1 | 8/2004 | Jackson | |
| 2004/0176157 | A1 * | 9/2004 | Walker et al. | 463/16 |
| 2005/0049031 | A1 | 3/2005 | Jackson | |
| 2005/0051952 | A1 | 3/2005 | Jackson | |

* cited by examiner

*Primary Examiner* — David L Lewis
*Assistant Examiner* — Justin Myhr
(74) *Attorney, Agent, or Firm* — Nixon Peabody LLP

(57) ABSTRACT

A gaming machine includes a wager-input device for receiving a wager from a player to play a wagering game. A display displays a plurality of moveable reels having symbols located thereon during the wagering game. The symbols indicate a randomly selected outcome selected from a plurality of outcomes in response to the wager. The plurality of outcomes include at least a first winning outcome along a first active payline and a second winning outcome along a second active payline. In response to the first winning outcome and the second winning outcome being achieved, the first active payline and the second active payline are successively displayed to the player before the first winning outcome and the second winning outcome are indicated to the player.

20 Claims, 9 Drawing Sheets

WAGERING GAME WITH PREVIEW FEATURE FOR A WINNING PAYLINE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine for implementing a wagering game having a preview feature for successively displaying winning paylines prior to displaying winning symbol combinations.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming, options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

There are slot wagering games that successively display winning paylines with the winning symbol combinations highlighted when the player has achieved multiple wins. However, the display of the winning symbol combinations typically occurs relatively quickly, and the player may quickly become bored with the wagering game.

There are also slot wagering games in the art that implement an "expanding wild" symbol feature. An expanding wild is a wild symbol that becomes wild, e.g., across multiple symbols on a reel. When an expanding wild is implemented, the player's winning symbol combinations are slowly shown one-at-a-time, and then the payouts from the winning symbol combinations are paid. However, the winning paylines are not displayed separately from the winning symbol combinations. Because the winning symbol combinations are slowly displayed one-at-a-time, the player may become bored and cancel the sequence, which gives the player the incorrect impression that few paylines were hit. Accordingly, the player may become dissatisfied with the wagering game and move to a different gaming machine for additional game play.

Wagering games need to include additional features that will maintain the player's interest and enhance entertainment. The present invention is directed to satisfying this and other needs.

SUMMARY OF THE INVENTION

According to one aspect of the present invention, a gaming machine is provided that includes a wager-input device for receiving a wager from a player to play a wagering game. A display displays a plurality of moveable reels having symbols located thereon during the wagering game. The symbols indicate a randomly selected outcome selected from a plurality of outcomes in response to the wager. The plurality of outcomes include at least a first winning outcome along a first active payline and a second winning outcome along a second active payline. In response to the first winning outcome and the second winning outcome being achieved, the first active payline and the second active payline are successively displayed to the player before the first winning outcome and the second winning outcome are indicated to the player.

According to an embodiment of the invention, a method of conducting a wagering game on a gaming machine includes receiving a wager from a player to play the wagering game. At least a first winning outcome and a second winning outcome are randomly selected from a plurality of outcomes in response to the wager. A plurality of moveable reels having symbols located thereon are displayed during the wagering game. The symbols indicate the first winning outcome along a first active payline and the second winning outcome along a second active payline. The first active payline and the second active payline are successively displayed and then the first winning outcome and the second winning outcome are indicated.

According to an additional aspect of the invention, a gaming system for playing a wagering game includes at least one display and a controller coupled to the display. The controller is programmed to initiate the wagering game in response to detection of a wager from a player. The wagering game randomly selects at least a first winning outcome and a second winning outcome from a plurality of outcomes. The controller is further programmed to display a plurality of moveable reels having symbols located thereon during the wagering game. The symbols indicate the first winning outcome along a first active payline and the second winning outcome along a second active payline. The first active payline and the second active payline are successively displayed and then the first winning outcome and the second winning outcome are indicated.

Additional aspects of the invention will be apparent to those of ordinary skill in the art in view of the detailed description of various embodiments, which is made with reference to the drawings, a brief description of which is provided below.

DETAILED DESCRIPTION

Figure 1:
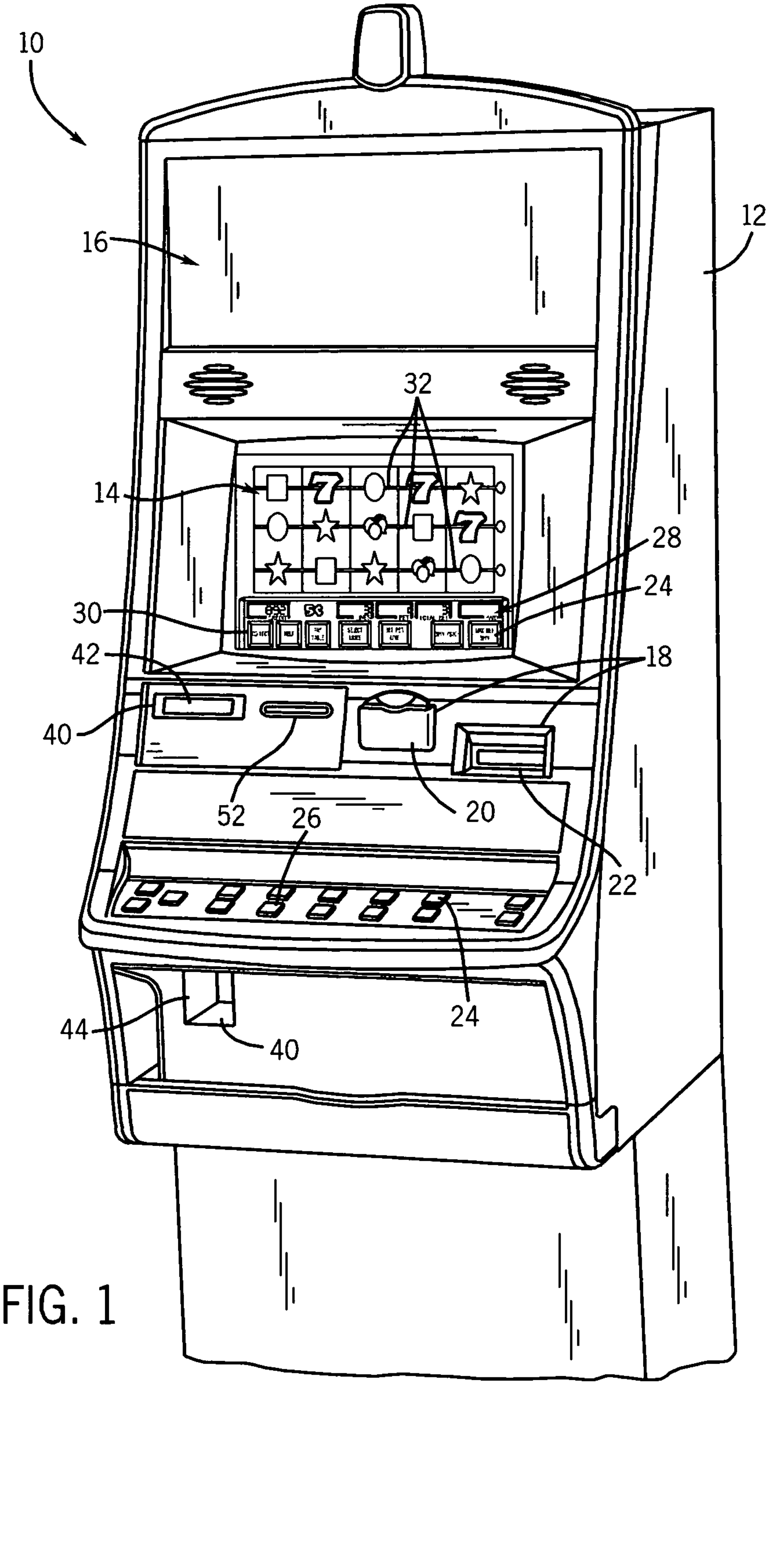
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Aliernatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
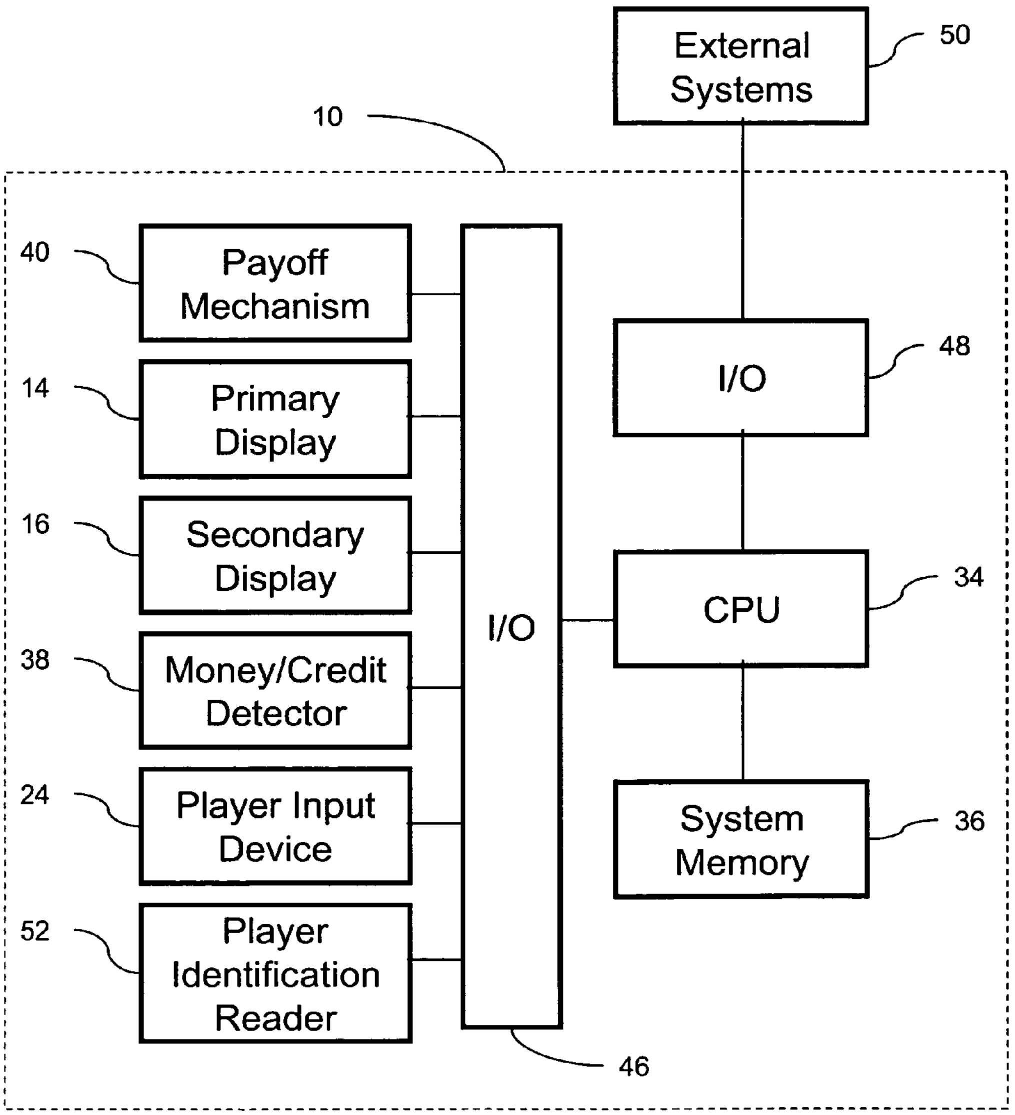
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

FIGS. 3A-3G illustrate various screens displayed on the primary display 14 for a wagering game according to an embodiment of the invention. The wagering game implements a preview feature for successively displaying multiple winning paylines, one-at-a-time, when multiple winning outcomes have been achieved. After the winning paylines have all been displayed, the winning symbol combinations for each of the winning paylines are successively displayed, one-at-at-time, and the player is awarded payouts for the winning symbol combinations. The wagering game may also provide a sound effect, e.g., a drumbeat that is played progressively faster as the player's winning paylines are successively displayed, to provide additional excitement to the player. The sound effect may be broadcast from a speaker housed in the gaming machine 10.

In some embodiments, the preview feature is implemented whenever the player has achieved multiple winning symbol combinations. In the preferred embodiment, the preview feature is implemented when an "expanding wild" feature is also implemented. An expanding wild is a wild symbol that causes other symbols on, e.g., a single reel or on multiple reels to become wild. According to an embodiment of the invention, when the expanding wild is awarded on a reel, the player's winning paylines are all shown successively, one-at-a-time, and then the winning symbol combinations are successively shown, individually, as discussed above. The speed at which each successive winning payline is displayed may accelerate with each successive winning payline displayed.

Figure 3A:
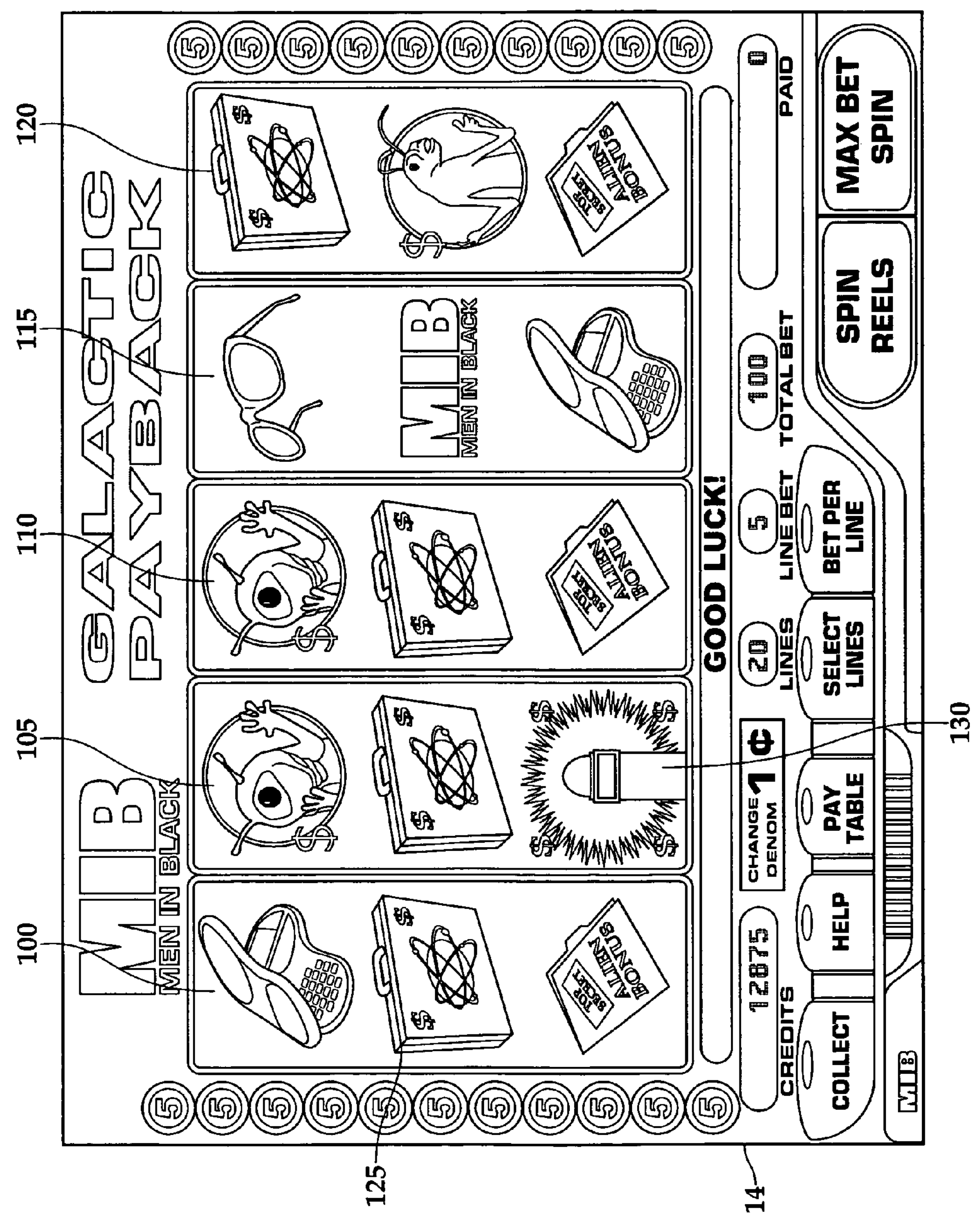
FIGS. 3A-3G illustrate various screens displayed on the primary display for a wagering game according to an embodiment of the invention.

Referring to FIG. 3A, a slot wagering game is displayed on the primary display 14. As shown, the slot wagering game includes five symbol-bearing reels, 100, 105, 110, 115, and 120. In other embodiments, more or fewer than five symbol-bearing reels 100, 105, 110, 115, and 120 may be utilized. Three symbols are visible on each of the symbol-bearing reels, 100, 105, 110, 115, and 120. In other embodiments, more or fewer than three symbols are visible on each of the symbol-bearing reels 100, 105, 110, 115, and 120. The symbol-bearing reels are illustrated as being simulated on a video display but may alternatively be electromechanical reels driven, e.g., stepper motors. In this embodiment, a combination of at least three symbols on an active payline 32 provides a winning outcome. As illustrated, the player has achieved a combination of three briefcase symbols 125 as the middle visible symbol on reels 100, 105, and 110. However, the player also achieved an "expanding wild" bonus triggering symbol 130. The "expanding wild" bonus triggering symbol 130 provides an expanding wild symbol across at least two symbols on a reel. In some embodiments, the "expanding wild" bonus triggering symbol only expands to a wild symbol across multiple symbol positions on a reel if the conversion of other symbols on the reel into wild symbols would provide winning combinations on active paylines 32 that would not have been possible if the previous symbols had not been converted into wild symbols. In some embodiments the "expanding wild" bonus triggering symbol 130 converts symbols located across different reels into wild symbols. The symbols converted may also be randomly selected in some embodiments.

Figure 3B:
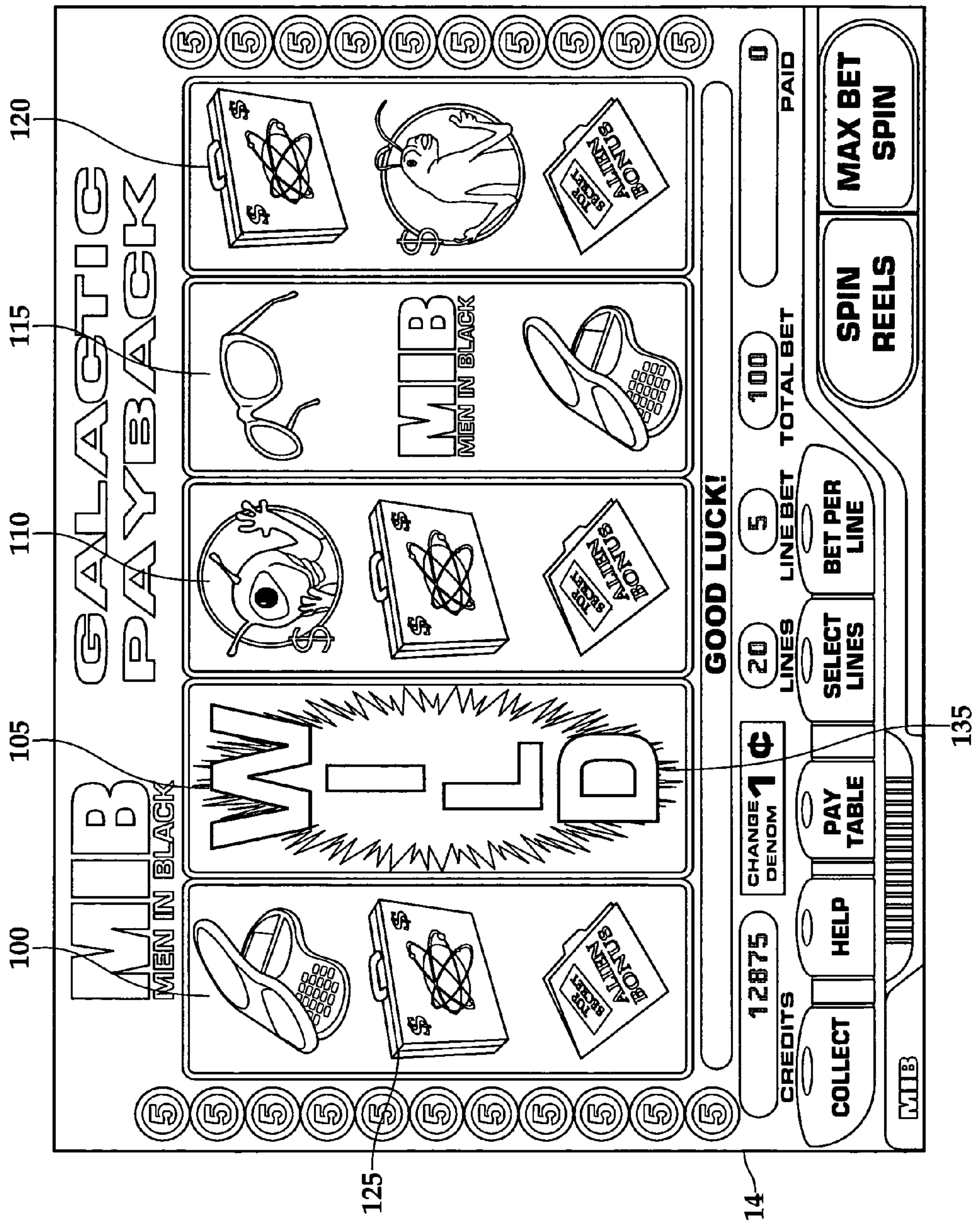

In the embodiment shown in FIG. 3A, the player has multiple active paylines, more than one of which provide combinations that would be improved if the expanding wild were to be implemented across the second reel 105, as discussed with respect to FIGS. 3B-3E below. Accordingly, the expanding wild feature is implemented by the "expanding wild" bonus triggering symbol 130. FIG. 3B illustrates the wagering game screen displayed on the primary display 14 when the expanding wild symbol 135 is awarded. As shown, the visible symbols on the second reel 105 all become wild.

After the expanding wild symbol 135 is displayed, the winning paylines for winning symbol combinations are displayed to the player and then the winning combinations are displayed and the player receives a payout for each winning symbol combination. The winning paylines are displayed successively, and each winning payline is displayed on top of the previous one until all have been displayed. In other words, the first winning payline is displayed, and then the second winning payline is displayed while the first winning payline is still displayed. Then the third winning payline is displayed while the first and second winning paylines are simultaneously displayed, etc.

In other embodiments, more than one, but less than all of the winning paylines are sequentially displayed to the player. In additional embodiments, only one winning payline is displayed at a time.

Focusing again on FIG. 3B, the wagering game on the primary display 14 is illustrated after the "expanding wild" bonus-triggering symbol 130 shown in FIG. 3A has expanded to convert other symbols into wild symbols. As shown, all of the symbols on the second reel 105 form the expanding wild symbol 135. As discussed above, in other embodiments, the expanding wild trigger may convert other symbols on other reels, besides those on the second reel 105, into wild symbols. Because the expanding wild symbol 135 completely encompasses all of the visible symbol positions on the second reel 105, all of the active paylines may be affected. As discussed above, the "expanding wild" bonus-triggering symbol 130 only triggers the expanding wild feature when the expansion would result in additional winning outcomes that would not be possible without the expansion. In other embodiments, the "expanding wild" bonus-triggering symbol 130 always triggers the expanding wild feature, regardless of whether the expansion results in additional winning outcomes.

Figure 3C:
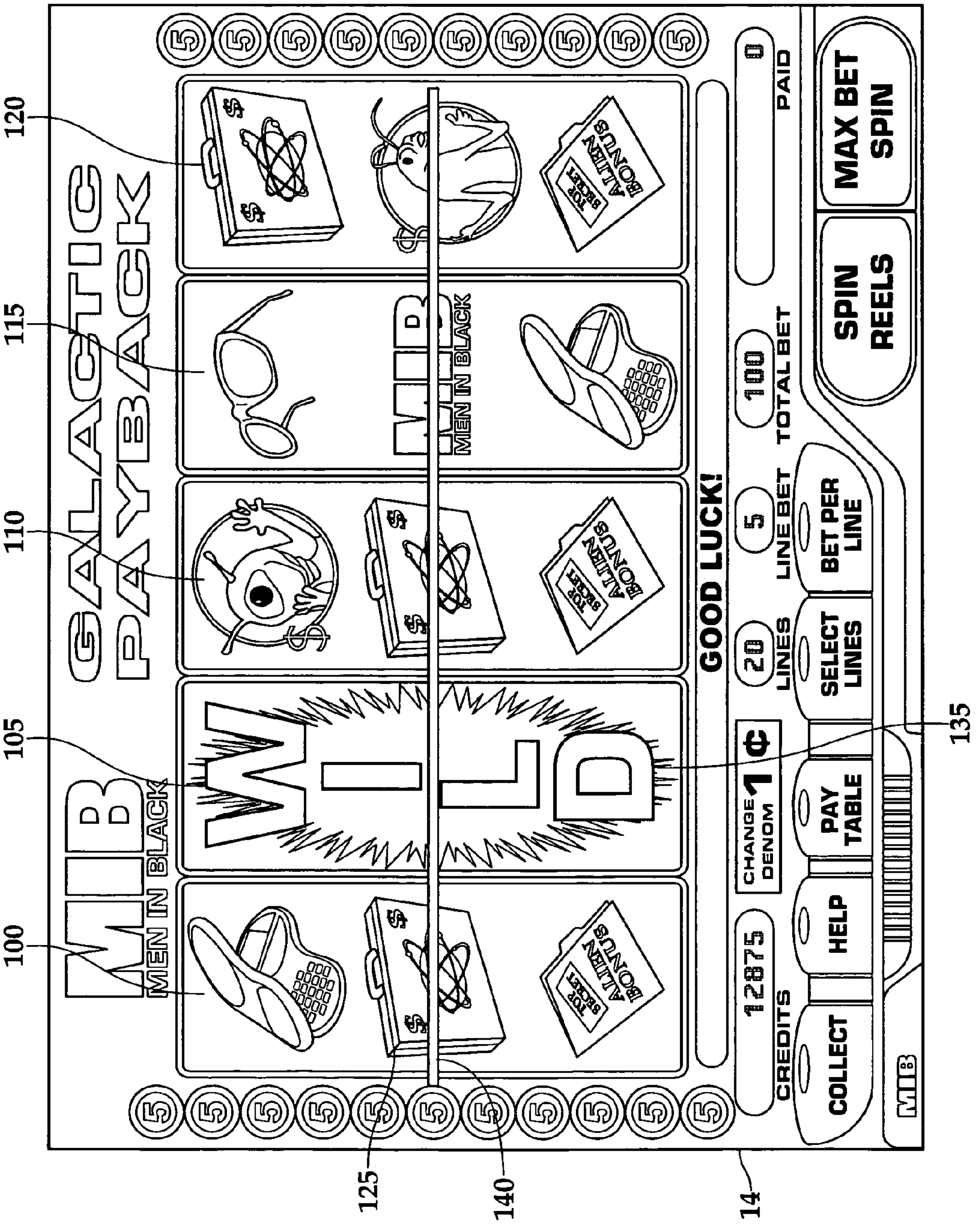

After the expanding wild feature is implemented, the winning paylines are sequentially displayed. The order in which the paylines are displayed may be random, or the paylines may be shown beginning with the one on which the winning combination providing the lowest payout of all the player's winning combination, and then the paylines providing progressively higher payouts are displayed, or vice-versa, for example. As shown in FIG. 3C, the first winning payline displayed is payline 140, where the player has achieved a winning combination of three suitcase symbols 125, formed of a suitcase symbol 140 on the first reel 100, the expanding wild symbol 135 on the second reel 105, and another suitcase symbol 125 on the third reel 110. The payline 140 may be displayed with a bright color, for example, so that it stands out from the rest of the symbols displayed in the wagering game shown on the primary display 14. When the first payline 140 is displayed, the symbols forming the winning symbol combination on the first payline 140 are not highlighted. Instead, only the first payline 140 itself is highlighted at this time. As discussed above, a sound effect, such as the sound of a drumbeat, may be played while the first payline 140 is displayed.

Figure 3D:
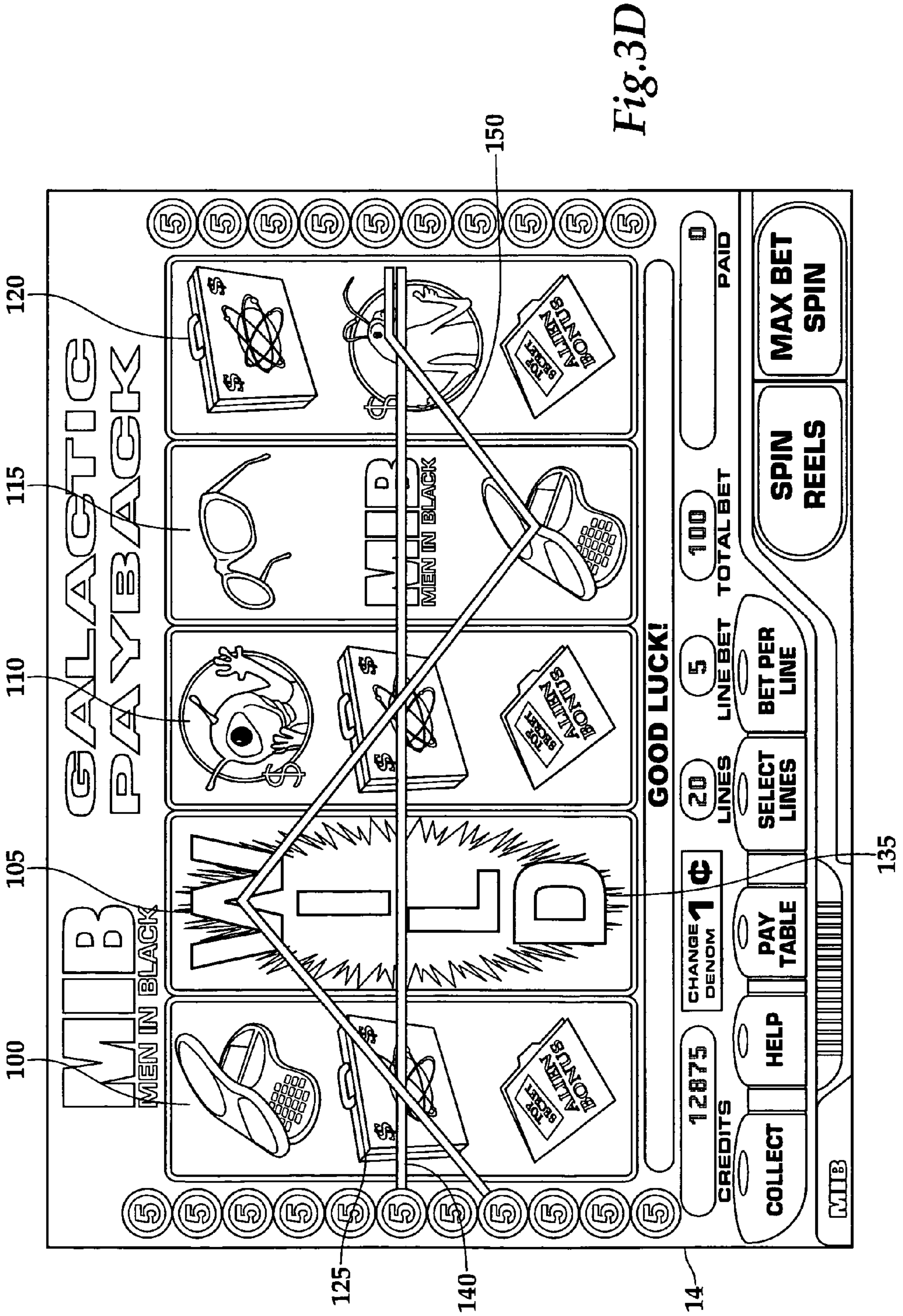

Shortly after the first winning payline 140 is displayed, the second winning payline 150 is displayed, as shown in FIG. 3D. The second winning payline 150 may be displayed with a different color than that used to display the first winning payline 140. The player has achieved a winning combination along the second payline 150 of the briefcase symbol 125 on the first reel 100, the expanding wild symbol 135 on the second reel 105, and the briefcase symbol 125 on the third reel 110. As the second winning payline 150 is displayed, the speed at which the drumbeat sound effect is played may increase and may continue to accelerate with each successive winning payline displayed.

Figure 3E:
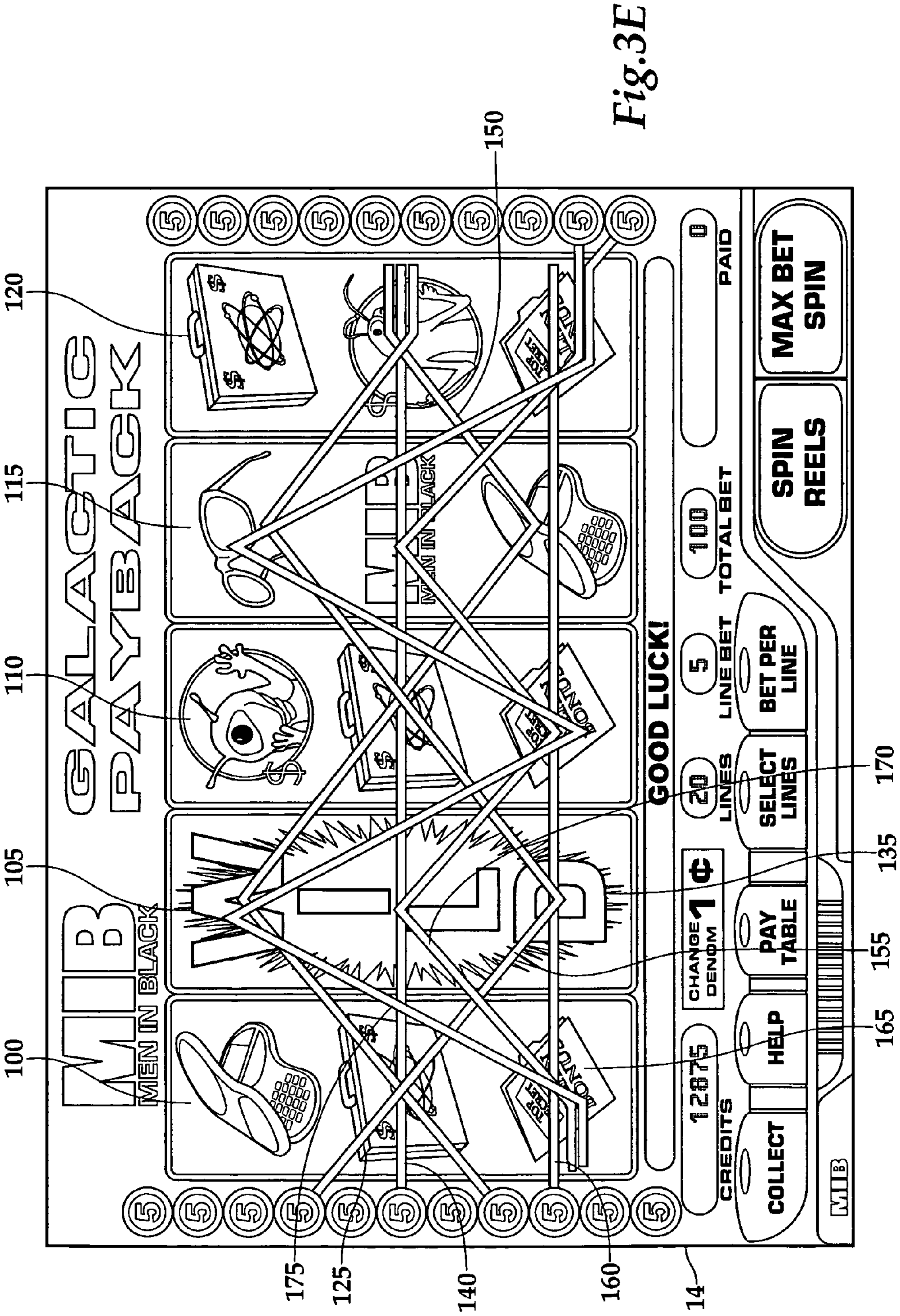

The third, fourth, fifth, and sixth winning paylines 155, 160, 170, and 175, respectively, are subsequently successively displayed to show that the player also has winning symbol combinations along these paylines. FIG. 3E illustrates the primary display 14 after all six of the winning paylines have been displayed. Next, the six highlighted winning paylines are removed and then the winning symbol combinations along each of the winning paylines are displayed and the player is awarded payouts for each of the winning combinations, as illustrated in FIGS. 3F and 3G.

Figure 3F:
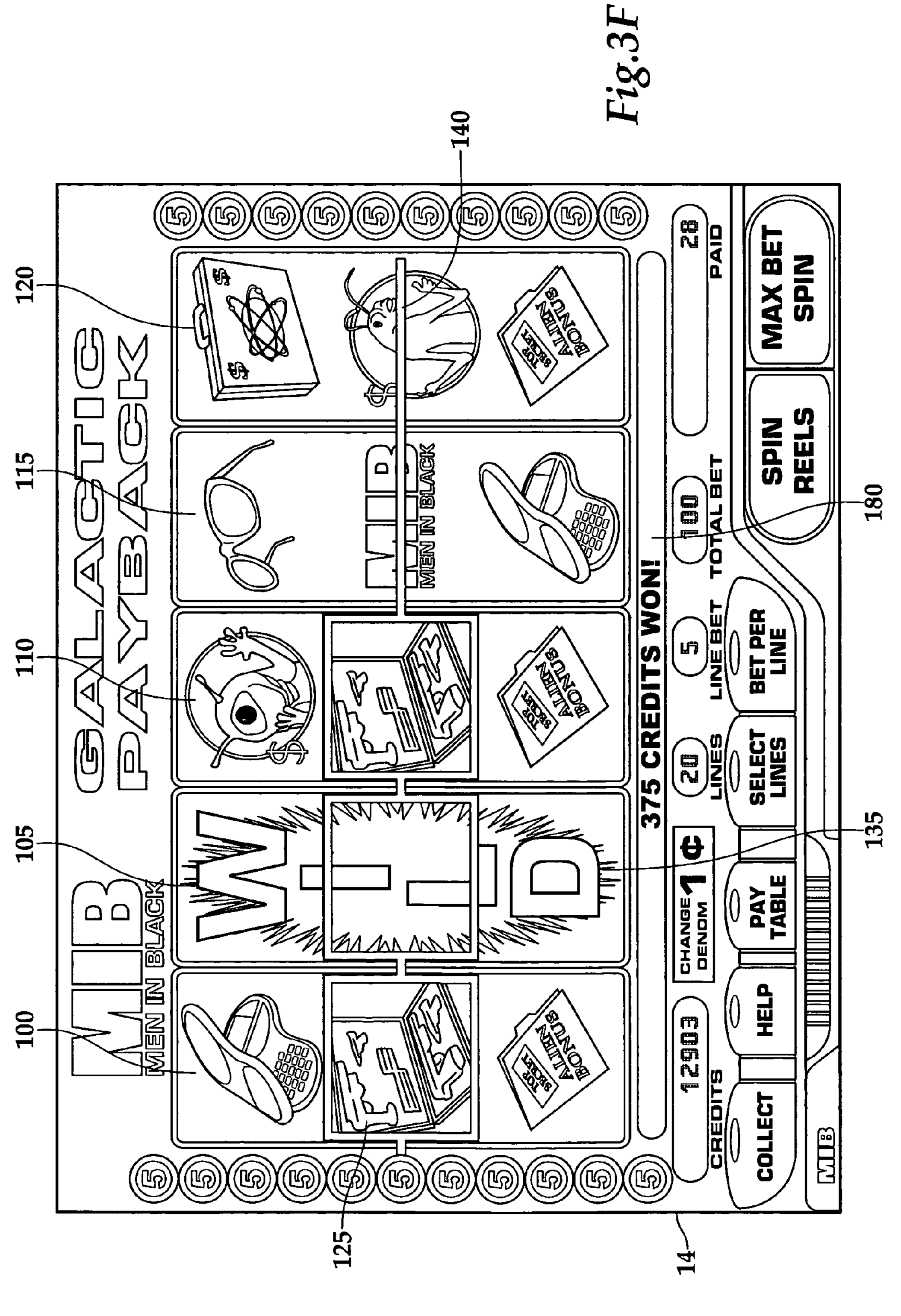

Referring to FIG. 3F, the winning combination along the first winning payline 140 is displayed along with the first winning payline 140. Each symbol forming part of the winning combination may be displayed with a highlighted box around the symbol. As shown, the first winning combination includes the briefcase symbol 125 on the first reel 100, the middle symbol position of the expanding wild symbol 135 on the second reel 105, and the briefcase symbol 125 on the third reel 110. The briefcase symbols 125 on the winning combination may be shown as open briefcases, revealing their contents. A banner 180 indicates that the player has won 375 credits for this winning combination. After the first winning combination has been displayed and the player's credits awarded for the winning combination are displayed on the banner 180, the highlighting for the first payline 140 and the symbols forming the first winning combination is removed. In other embodiments, the first winning combination may remain displayed while all of the additional winning combinations are subsequently displayed.

Figure 3G:
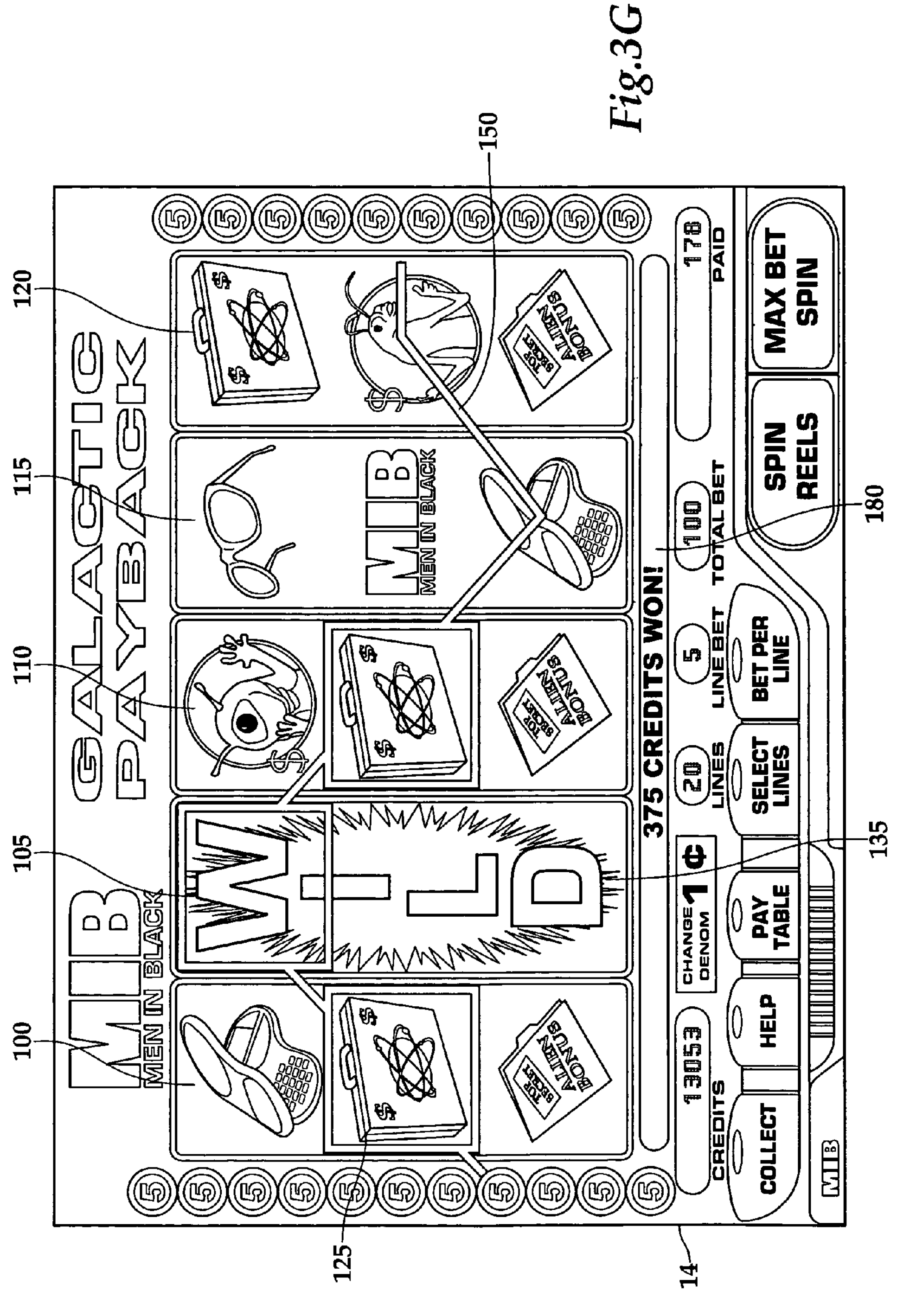

FIG. 3G illustrates the winning combination along the second winning payline 150 being displayed. As shown, the second winning combination includes the briefcase symbol 125 on the first reel 100, the top symbol position of the expanding wild symbol 135 on the second reel 105, and the briefcase symbol 125 on the third reel 110. The banner 180 indicates that the player has won 375 credits for this winning combination. The amount of credits awarded for this symbol combination is merely exemplary. It should be appreciated that any other suitable amount may instead be awarded to the player. The remaining four winning symbol combinations along the third, fourth, fifth, and sixth winning paylines are then successively displayed one-at-a-time.

Accordingly, as illustrated in FIGS. 3A-3G, an embodiment of the invention provides the player with exciting game play by successively displaying winning paylines prior to displaying winning symbol combinations and providing payouts. The sound effect accompanying the successive display of the winning paylines helps keep the player interested in the wagering game. Also, because the successive display of the winning paylines prior to the display of the winning symbol combinations occurs during a relatively long time interval, the player experiences the feeling as though a large award has been achieved.

The accelerated display of the paylines provides excitement to the player, maintaining the player's interest in the wagering game. A series of winning paylines may be displayed according to a timeline such as: "P . . . P . . . P . . . P .

. . P . . . PPPPPP," where each "P" is a payline that is displayed to the player. The entire presentation of all winning paylines may last, e.g., 2-3 seconds.

The highlighting of the winning symbol combinations in FIGS. 3F and 3G may be implemented in several different ways. For example, the borders of the symbols may indicated with, e.g., dark lines to visually indicate the symbols in each winning symbol combination. Alternatively, the symbols in the winning symbol combinations may be shown as flashing (e.g., rapidly displaying the symbols with high brightness and then low brightness). In other embodiments, the symbols in the winning symbol combinations may be shown with a relatively large brightness. The symbols in the winning symbol combinations may also be shown with different colors than the other displayed symbols that do not form part of the winning symbol combinations.

Each of these embodiments and obvious variations thereof is contemplated as falling within the spirit and scope of the claimed invention, which is set forth in the following claims.

What is claimed is:

1. A gaming machine comprising:

a wager-input device for receiving a wager from a player to play a wagering game;

a display for displaying a plurality of moveable reels having symbols located thereon during the wagering game, the symbols indicating a randomly selected outcome selected from a plurality of outcomes in response to the wager, the plurality of outcomes including at least a first winning outcome including a first winning symbol combination along a first active payline and a second winning outcome including a second winning symbol combination along a second active payline;

wherein in response to the first winning outcome and the second winning outcome being achieved, the first active payline and the second active payline are successively displayed to the player prior to the first winning symbol combination and the second winning symbol combination being indicated to the player.

2. The gaming machine of claim 1, wherein the symbols include an expanding wild bonus triggering symbol for triggering an expanding wild bonus that encompasses predetermined symbol positions on the moveable reels.

3. The gaming machine of claim 2, wherein the expanding wild bonus trigger triggers the expanding wild bonus only when the expanding wild bonus provides additional winning outcomes.

4. The gaming machine of claim 1, wherein the gaming machine includes a speaker for broadcasting a sound effect while the first active payline and the second active payline are successively displayed, a speed at which the sound effect is presented increasing when the second active payline is displayed.

5. The gaming machine of claim 1, wherein the plurality of winning outcomes includes a third winning outcome along a third active payline, the third active payline being displayed after the second active payline is displayed.

6. The gaming machine of claim 5, wherein a speed at which the first active payline, the second active payline, and a third active payline are successively displayed accelerates with each of the successively displayed first active payline, second active payline, and the third active payline.

7. The gaming machine of claim 1, wherein the indicating of the first winning symbol combination includes highlighting the first winning symbol combination.

8. A method of conducting a wagering game on a gaming machine, the method comprising:

using a wager-input device to receive a wager from a player to play the wagering game;

using one or more processors to randomly select at least a first winning outcome and a second winning outcome from a plurality of outcomes in response to the wager, the first winning outcome including a first winning symbol combination and the second winning outcome including a second winning symbol combination;

using one or more displays to display a plurality of moveable reels having symbols located thereon during the wagering game, the symbols indicating the first winning outcome along a first active payline and the second winning outcome along a second active payline;

successively displaying the first active payline and the second active payline on the one or more displays; and after the successive displaying, indicating the first winning symbol combination and the second winning symbol combination.

9. The method of claim 8, wherein the symbols include an expanding wild bonus triggering symbol for triggering an expanding wild bonus that encompasses predetermined symbol positions on the moveable reels.

10. The method of claim 8, wherein a sound effect is presented while the first active payline and the second active payline are successively displayed, a speed at which the sound effect is presented increasing when the second active payline is displayed.

11. The method of claim 8, wherein a speed at which the first active payline, the second active payline, and a third active payline are successively displayed accelerates with each of the successively displayed first active payline, second active payline, and the third active payline.

12. The method of claim 8, wherein the indicating of the first winning symbol combination includes highlighting the first winning symbol combination.

13. A computer readable storage medium encoded with instructions for directing a gaming device to perform the method of claim 8.

14. A gaming machine for playing a wagering game, comprising:

at least one display; and a controller coupled to the display and programmed to initiate the wagering game in response to detection of a wager from a player, wherein the wagering game randomly selects at least a first winning outcome including a first winning symbol combination and a second winning outcome including a second winning symbol combination from a plurality of outcomes;

display, on at least one display, a plurality of moveable reels having symbols located thereon during the wagering game, the symbols indicating the first winning outcome along a first active payline and the second winning outcome along a second active payline;

successively display the first active payline and the second active payline; and after the successive display, indicate the first winning symbol combination and the second winning symbol combination.

15. The gaming machine of claim 14, wherein the display and the controller are both located within a gaming machine.

16. The gaming machine of claim 14, wherein the display is located within a gaming terminal and the controller is located outside of the gaming machine.

17. The gaming machine of claim 14, wherein the symbols include an expanding wild bonus triggering symbol for triggering an expanding wild bonus that encompasses predetermined symbol positions on the moveable reels, the expanding wild bonus forming a portion of the first winning symbol combination and the second winning symbol combination.

18. The gaming machine of claim 14, wherein a sound effect is presented while the first active payline and the second active payline are successively displayed, a speed at which the sound effect is presented increasing when the second active payline is displayed.

19. The gaming machine of claim 14, wherein a speed at which the first active payline, the second active payline, and a third active payline are successively displayed accelerates with each of the successively displayed first active payline, second active payline, and the third active payline.

20. The gaming machine of claim 14, wherein the indicating of the first winning symbol combination includes highlighting the first winning symbol combination.

* * * * *